United States Patent [19]

Tazaki et al.

[11] Patent Number: 4,543,590

[45] Date of Patent: Sep. 24, 1985

[54] ELECTRONIC APPARATUS WITH PRINTER

[75] Inventors: Shigemitsu Tazaki, Matsudo; Hiroshi Kyogoku, Mine, both of Japan

[73] Assignee: Canon Kabushiki Kaisha, Tokyo, Japan

[21] Appl. No.: 631,014

[22] Filed: Jul. 17, 1984

Related U.S. Application Data

[63] Continuation of Ser. No. 464,575, Feb. 7, 1983, abandoned.

[30] Foreign Application Priority Data

Feb. 17, 1982 [JP] Japan ................................ 57-22806

[51] Int. Cl.[4] ............................................ G01D 15/18

[52] U.S. Cl. ................................ 346/140 R; 358/78; 400/126

[58] Field of Search ............ 346/140 R, 75; 400/126, 400/124; 58/75, 78

[56] References Cited

U.S. PATENT DOCUMENTS

| | | | |
|---|---|---|---|
| 4,313,684 | 2/1982 | Tazaki | 346/140 X |
| 4,329,698 | 5/1982 | Smith | 346/140 |
| 4,403,874 | 9/1983 | Payne | 400/124 |
| 4,467,348 | 8/1984 | Fujii | 358/78 |

*Primary Examiner*—Joseph W. Hartary

*Attorney, Agent, or Firm*—Fitzpatrick, Cella, Harper & Scinto

[57] ABSTRACT

Disclosed is an electronic apparatus provided with a printer for printing characters on a recording material with at least two different colors of ink. The apparatus has means for setting a special printing mode. In the special printing mode, data are printed with ink in the first color while printing a background pattern with ink in the second color thereby forming a print with a background pattern.

11 Claims, 17 Drawing Figures

| FIG. 4B-1 | FIG. 4B-2 | FIG. 4B-3 |
|---|---|---|

ELECTRONIC APPARATUS WITH PRINTER

This application is a continuation of application Ser. No. 464,575 filed Feb. 7, 1983, now abandoned.

BACKGROUND OF THE INVENTION

1. Field of the Invention

The present invention relates to a novel printing system for electronic apparatus provided with a printer, such as an electronic table calculator with printer (hereinafter such electronic apparatus is referred to simply as a printer machine).

2. Description of Prior Art

In the conventional printer machine, when the result of a calculation is printed for a key input on the key board, a symbol corresponding to the key input is printed together with data in one color, red or black, and on one line. Also, the conventional printer machine has some special keys which are used, for example, when data or a code number is printed. Non-address key ([#] key) is an example of such special key. The printed symbol (#) corresponding to the key input of the non-address key is used to distinguish one item of calculation from other items or to represent the title.

However, this printing mode according to the prior art has some drawbacks. When the operator sees the printing paper printed in this printing mode after a series of calculations, it is difficult to understand at once what the printed output in a certain line means. The operator has to judge it from the print form (character printed at the most significant figure) or the printed symbol (#). It is never easy for the operator to quickly and correctly distinguish those printed data by the non-address key input from others at a glance. It renders the work in sorting the calculation items on the printing paper very troublesome and time-consuming.

SUMMARY OF THE INVENTION

Accordingly, the object of the present invention is to provide an electronic apparatus with printer which eliminates the drawbacks involved in the prior art as mentioned above.

According to the invention, there is provided an electronic apparatus with an ink jet printer which can operate in a special printing mode when it is selected.

When the special printing mode is selected by key input of a special key such as [#] key or [T] key, data are printed in a first color and also a background pattern is printed in a second color together with the data. Such printed data with a background pattern is easily distinguishable from other data without any background pattern printed in the ordinary printing mode on the same printing paper.

Other objects, features and advantages of the invention will appear more fully from the following description taken in connection with the accompanying drawings.

DETAILED DESCRIPTION OF THE PREFERRED EMBODIMENTS

Figure 1:
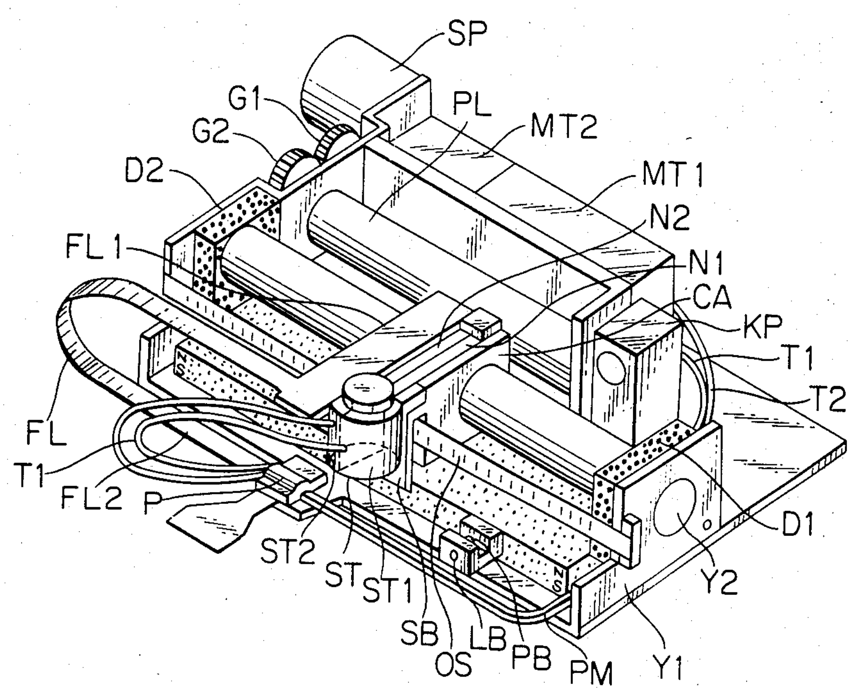
FIG. 1 is a perspective view of a printer in which the present invention has been embodied.
Figure 2:
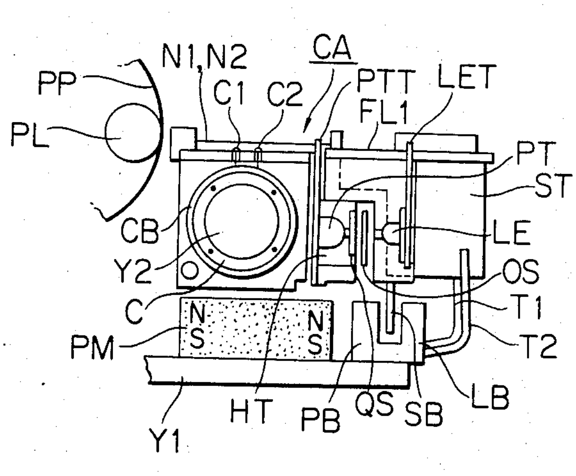
FIG. 2 shows the arrangement of members in the carriage CA.

Referring to FIGS. 1 and 2 showing a printer embodying the present invention, the printer includes a carriage CA on which a recording head having two ink jet nozzles N1 and N2 is mounted. To effect printing on a printing paper PP, ink in a first color is jetted from the first nozzle N1 and ink in a second color from the second nozzle N2. The carriage CA is mounted on a slide shaft Y2 for reciprocal slide movement along the slide shaft. The carriage CA is driven by a linear motor comprising a closed magnetic circuit formed of a permanent magnet PM, a magnetic plate Y1 and the magnetic slide shaft Y2. On the slide shaft Y2 there is a slidable coil bobbin CB with a coil C coiled around the bobbin. When current is supplied to the coil C, the carriage CA having the coil bobbin CB as an integral part of the carriage is driven according to Fleming's left-hand rule. By changing the flow direction of the current to the coil C, the running direction of the carriage along the slide shaft Y2 is changed. Thus, the carriage is moved reciprocally along the shaft Y2.

A calibrated slit plate OS is vertically fixed to the magnetic plate Y1 by which also the slide shaft Y2 is supported. The slit plate OS is made of, for example, a non-magnetic material.

On the carriage CA there are mounted, in addition to the above-mentioned coil bobbin CB with coil C and the ink jet nozzles N1 and N2, also subsidiary ink tanks ST1 and ST2 for ink supply to the nozzles N1 and N2, a light-emitting element such as photo transistor PT, a flexible wiring board FL and a screen board SB. The screen board SB is so disposed as to shut off the light between photo diode LB and photo transistor PB at the home position of the carriage.

Electrically and mechanically connected to one terminal FL1 of the flexible wiring board FL are terminals C1 and C2 of the coil C, terminals of piezo-electric elements PZ1 and PZ2 (not shown) serving as the driving sources of the ink jet nozzles N1 and N2, and terminals LET and PTT of the photo diode LE and photo transistor PT. The other terminal part FL2 of the flexible wiring board FL is held fixedly together with ink supply tubes T1 and T2 by a pressure plate P. The ink supply tubes T1 and T2 extend backward through the space between permanent magnet PM and magnetic plate Y1 which space is magnetically required as air gap between PM and Y1. The rear ends of the ink supply tubes T1 and T2 are connected to main ink tanks MT1 and MT2 respectively to supply ink to a sub-tank ST. The inner room of the sub-tank ST is divided into two parts by a partition wall to form the first and second subsidiary ink tanks ST1 and ST2. The first color ink is supplied to the first subsidiary ink tank ST1 from the main tank MT1 and the second color ink is supplied to ST2 from MT2.

Figures 3A, 3B:
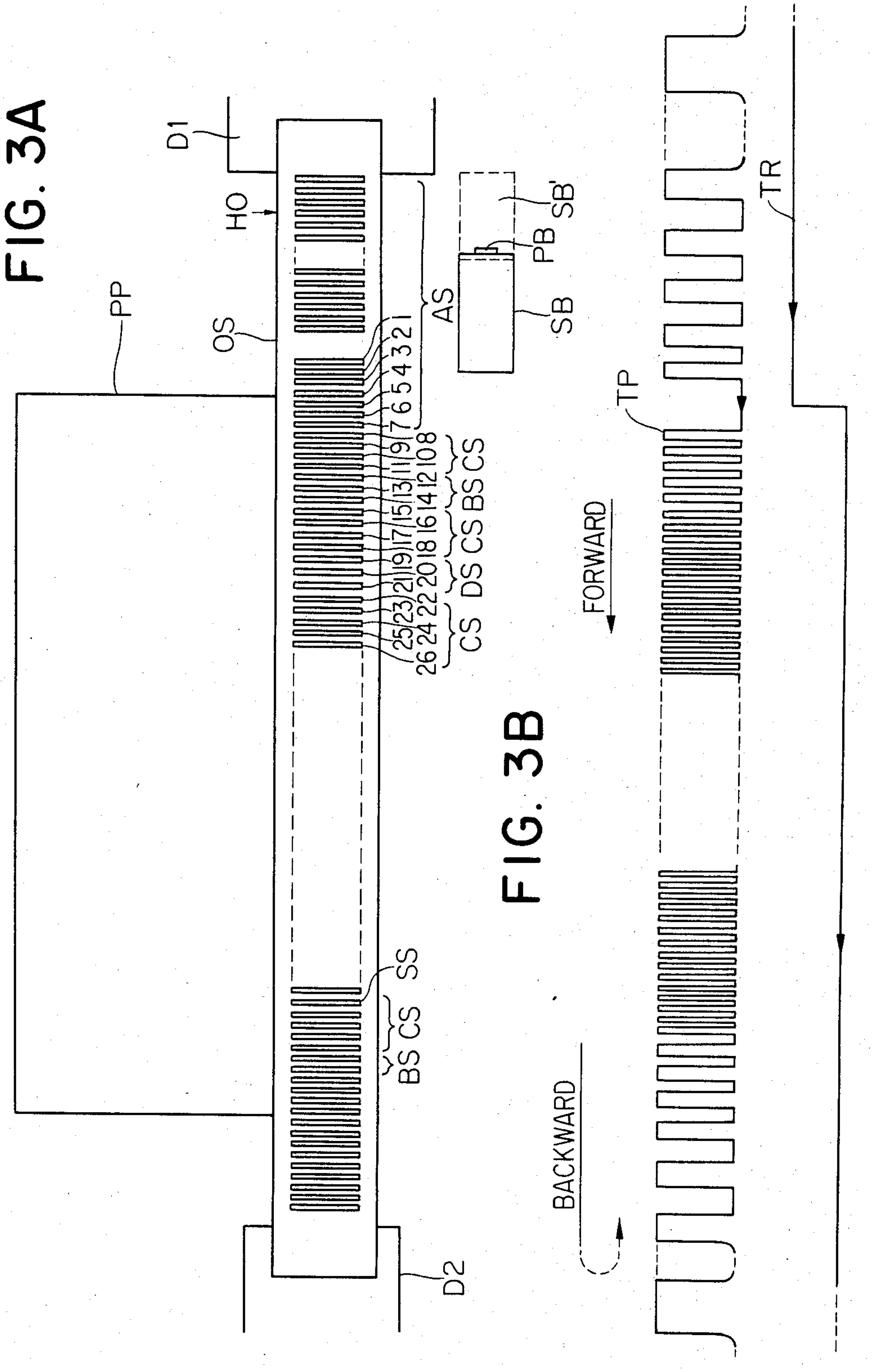
FIG. 3A is an enlarged view of the calibrated slot plate OS.
FIG. 3B shows the waveforms of pulse signals TP and TR generated with the movement of the carriage CA.

The slit plate OS is disposed perpendicularly to the recording head N1, N2 and extends passing through between the photo diode LE and the photo transistor PT. This arrangement reduces the space required for the slit plate and therefore reduces the size of the apparatus. As shown in FIG. 3A, a large number of slits SS are formed in the slit plate PS at regular intervals (slit pitch). On the light receiving part of the photo transistor PT there is provided a reception slit member QS having slits the pitch of which is the same as the pitch of slit SS on the slit plate OS. Therefore, with the movement of the carriage CA, the infrared light emitted from the photo diode LE is projected on the light receiving part of the photo transistor PT intermittently through the slits SS and the reception slits QS to turn the photo transistor PT ON and OFF repeatedly. As a result, a series of timing pulses TP are generated from the photo transistor PT as shown in FIG. 3B. As will be described in detail later, the speed and position of the carriage CA during scanning are detected by means of the timing pulse STP to control the printing speed, ink jet nozzles N1, N2 and a paper feeding pulse motor SP. Since the screen board SB is moved together with the carriage CA, the photo transistor PB at the home position is also turned ON and OFF similarly to the above, which makes a signal indicating whether the carriage CA is at the home position or not.

With the ink jet printer, every character is printed in the form of a dot matrix (for example, 5×7 dot matrix). The carriage CA is started scanning by the input of a print order signal. The position of the carriage is continuously detected by means of the above-mentioned timing pulse TP. In case a line of characters should be printed in the first color, a voltage is applied to the piezo-electric element PZ1 of the ink jet nozzle N1 when the carriage CA comes into a determined position. Ink droplets are jetted from the nozzle N1 toward the printing paper PP in response to the applied voltage to effect printing in the first dot line on the paper. At the end of the first dot line printing, the paper feed pulse motor SP is rotated in an amount corresponding to one dot pitch. At the same time, the carriage CA is moved back to the home position. The return of the carriage to the home position is detected by the photo transistor PB. To feed the printing paper PP, the rotation of the pulse motor SP is transmitted to the shaft of platen PL from a gear on the motor shaft (not shown) through reduction gears G1 and G2. The last stage reduction gear G2 is fixedly connected to the shaft of the platen PL to feed the printing paper PP in the direction of line and in a determined amount every time. The above operation of dot line printing is repeated a determined number of times (for example, seven dot lines). At the end of the last dot line printing, the platen PL is rotated by the pulse motor SP in a selected amount of distance including a line space. In this manner, the printing of a line of characters in the first ink color is completed.

In case the printing is to be carried out in the second ink color, a voltage is applied to the piezo-electric element PZ2 of the second nozzle N2. Ink droplets are jetted from the nozzle N2 toward the printing paper PP. After one dot line printing, the paper feed pulse motor SP is rotated one dot pitch and at the same time the carriage CA is moved back to the home position. The operation of dot line printing is repeated a number of times corresponding to the number of dot lines in a dot matrix. At the completion of printing of all the dot lines, the platen PL is rotated by the pulse motor SP in the selected amount of distance including a line space. Thus, the printing of a line of characters is completed.

After the completion of printing, the ink jet nozzle is moved to the position of cap KP and stopped there in the capped state to prevent the ink jet nozzle from being blocked off and dried, and also to prevent other possible troubles such as retrogradation of meniscus.

D1 and D2 are impact dampers made of foamed material or the like. The dampers absorb the shock to the carriage CA thereby preventing the run-out of ink from the nozzle orifice, the retrogradation of the meniscus, etc. The sub-tank ST is so positioned as not to directly contact the magnetic plate Y1, the damper D1 etc. so that almost no impact may be transmitted to the sub-tank. This has the effect of minimizing the bubbling of ink in the sub-tank. The main ink tanks MT1 and MT2 from which the first and second inks in different colors are supplied to the sub-tank ST (ST1 and ST2) through the ink supply tubes T1 and T2 respectively, have different storage capacities. In practice, the consumption of the first color ink is larger than that of the second color ink. To meet it, the main ink tank MT1 for the first color ink has a larger capacity than the main ink tank MT2 for the second color ink. Therefore, as a whole, the main tank contains no idle space and is very compact in construction.

As described above, in the shown embodiment, the calibrated slot plate OS is vertically disposed and the sizes of the main ink tanks MT1, MT2 and the sub-tank ST are determined considering the capacities practically required. These structural features make it possible to realize a small and thin type printer having a very simple structure. Furthermore, in the embodiment there is not used any revolving motor for driving the carriage CA. Therefore, gear, link, rack and the like are no longer necessary for driving the carriage. For paper feed there are used no ratchet, plunger or the like which generate noise. Thus, a noiseless recording apparatus is provided.

Another feature of the apparatus of this embodiment is found in the arrangement of slits SS in the calibrated plate OS which is shown in FIG. 3A. The slits perform two functions at the same time, that is, to detect and control the position of the carriage on one hand and also to control and uniformalize the speed thereof on the other hand.

As seen from FIG. 3A, the slit plate OS extends beyond the width of the printing paper PP. The carriage CA is moved starting from the home position HO. Slits designated by AS are approach slits and those slits designated by CS are character slits. Two blank slits BS are arranged after every five character slits CS. From the time point of the carriage start, the number of slits the carriage has passed, is counted using the position of the ink jet nozzle N1 or N2 as a reference to detect and control the position and speed of the carriage. For example, in case the position of the nozzle N1 for the first color ink is used as the reference point for counting slits, the adjustment of the running speed of the carriage is performed before the first eight slits have been counted from the start of carriage. When further eight slits are counted up, printing of the first one digit is started. During the following five slits (from No. 8 to No. 12), the printing of the first one digit is completed. Before printing the next digit, a blank is provided by two blank slits numbered 13 and 14. Following the blank, the next digit is printed. In this manner, the printing of character is repeated with the interposition of two slit blank between digit and digit. This arrangement of approach slits AS for detecting the print start position, character slits CS for effecting the character printing and blank slits BS for determining the blank between two neighbouring characters and the suitably selected spacing between the slits serve also to uniformalize the running speed of the carriage.

The initial running speed of the carriage and the start point of the reference at the home position of the carriage are variable case by case. Therefore, the position at which the signal of photo transistor PB is turned from ON to OFF is variable depending on the initial speed and the start point. Taking this variation into account, the screen part SB is provided to shield the photo transistor PB from light over a distance of several slits.

Figure 4A:
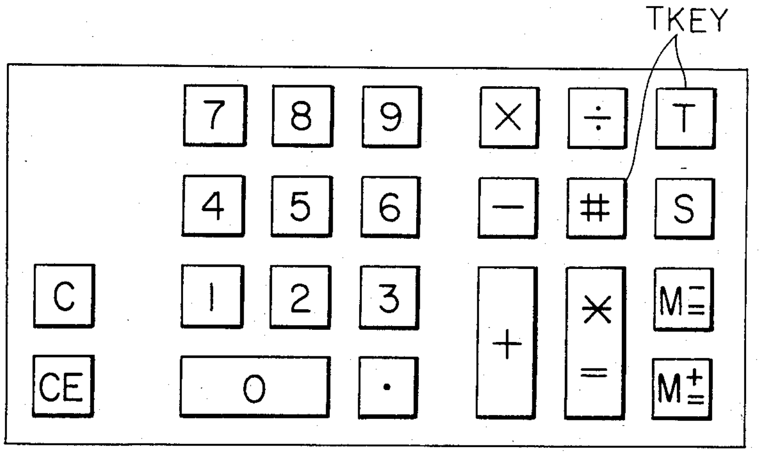
FIG. 4A shows an example of a key board used in the invention.
Figures 3, 4B:
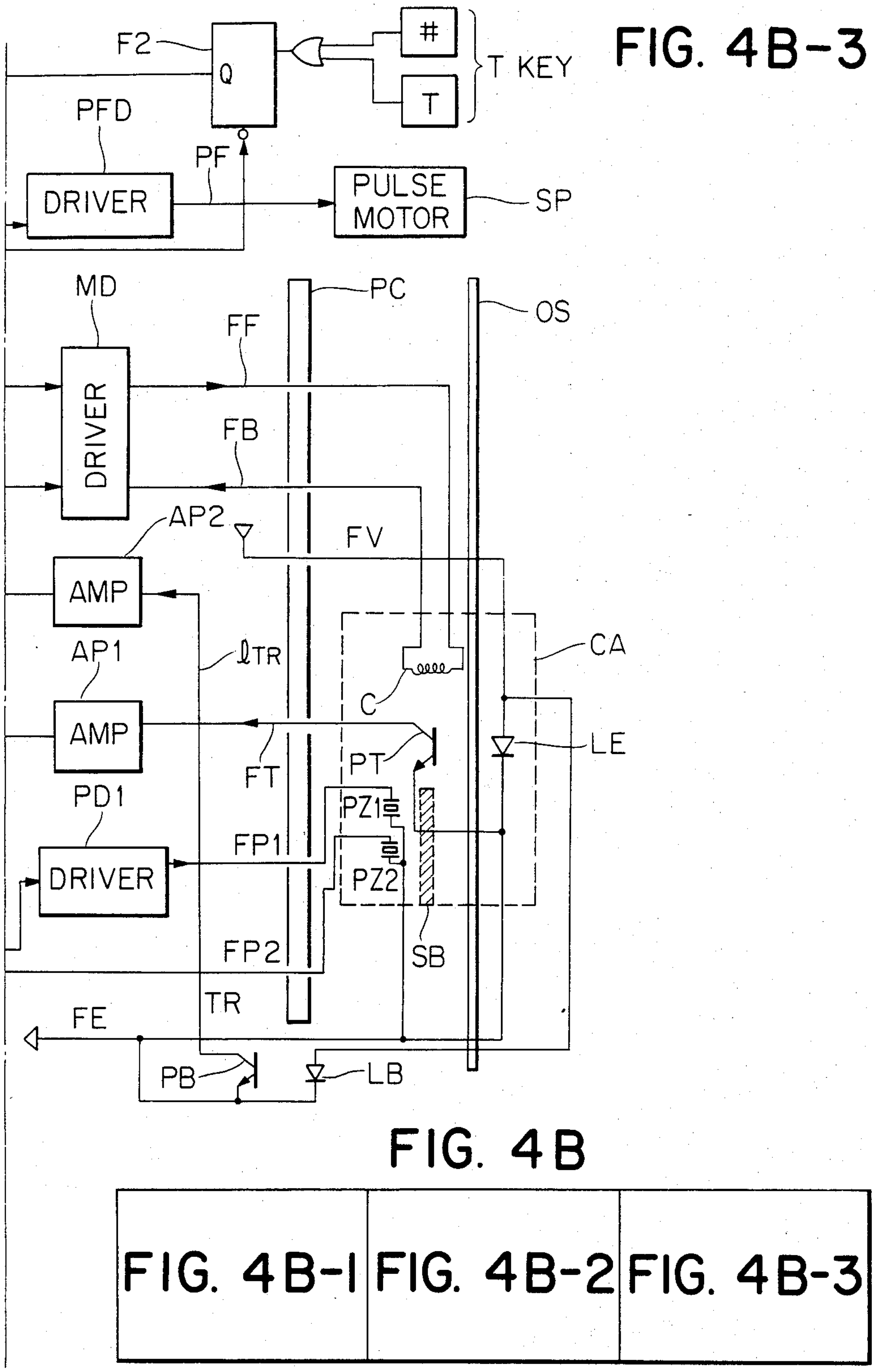
FIG. 4B, composed of FIGS. 4B-1, 4B-2 and 4B-3, is a block diagram showing an embodiment of the control circuit for controlling the operation of the printer according to the invention.
Figures 1, 4B:
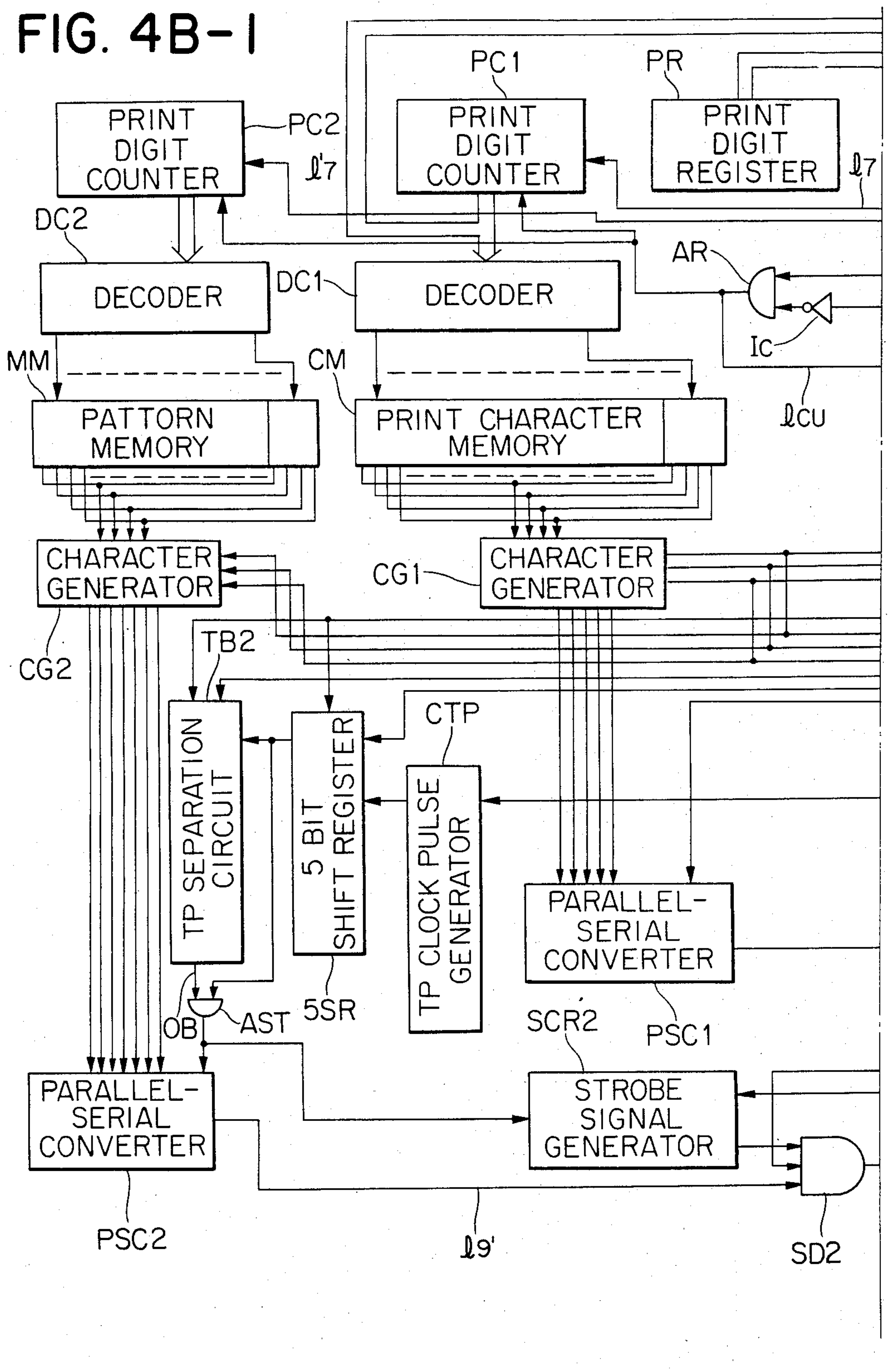
Figures 2, 4B:
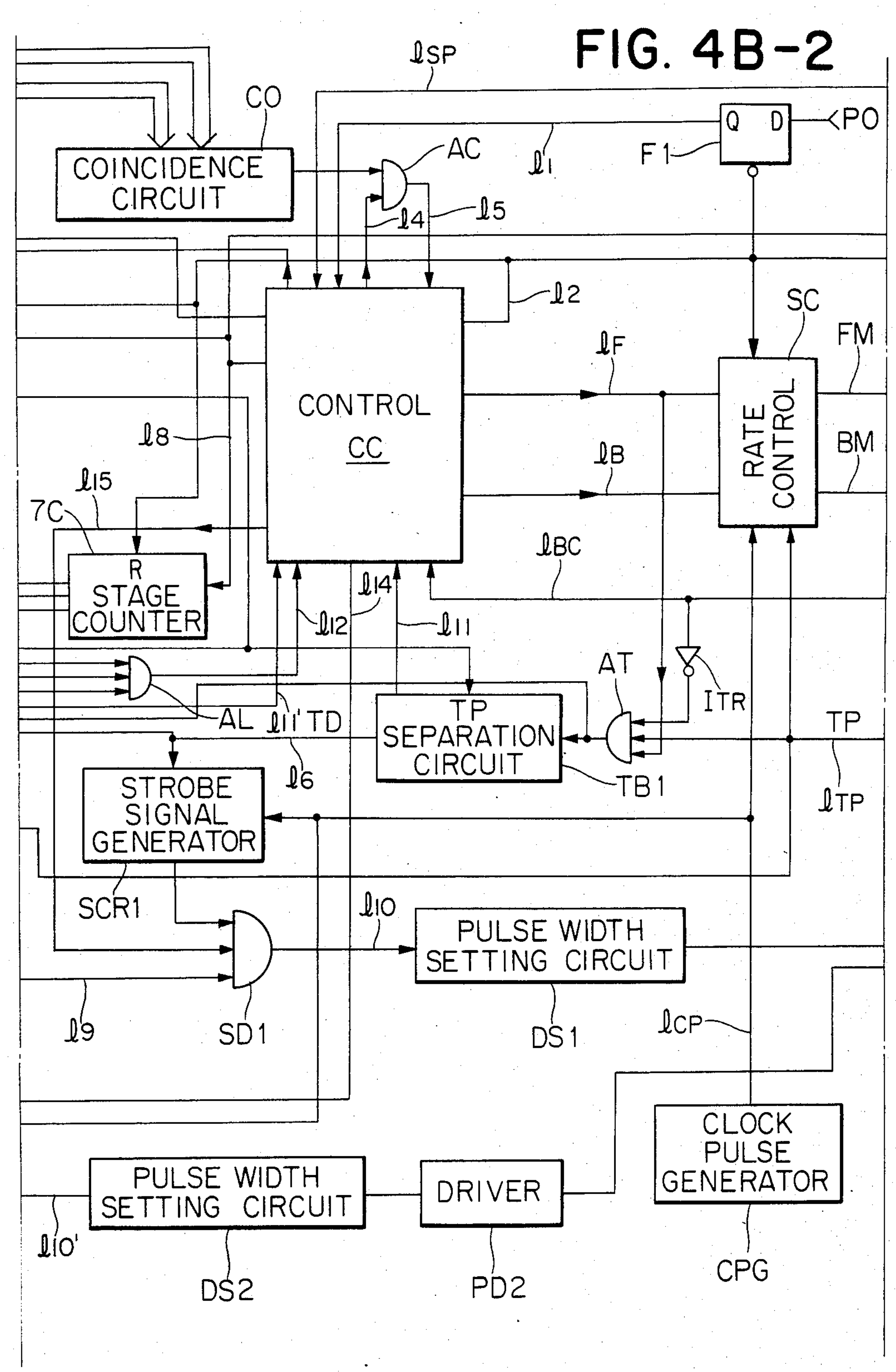

The structure and arrangement of the printer according to an embodiment of the invention have been described in the above. Hereinafter the printing operation of the printer according to the invention will be described with reference to FIGS. 4 and 5. FIG. 4A shows an example of the key board of the printer, FIG. 4B an example of the control part for controlling the printing operation of the above described embodiment and FIG. 5 a timing chart of the printing operation.

On the key board shown in FIG. 4A there are arranged many keys of which [#] and [T] are special keys TKEY. When either of the special keys is depressed for key input, the printing operation is carried out in special printing mode. At first the operation in special printing mode will be described with reference to FIGS. 4B and 5.

By the input of a print order signal PO a flip-flop F1 is set and a set output signal l1 is applied to the control part CC. Receiving the signal, the control part CC gets in the state prepared for printing operation.

In the control part CC, the state of a flip-flop F2 is at first discriminated to know whether or not the special printing mode has been ordered by the input of special key TKEY. The flip-flop F2 is set by the special key input and the logic of its output lSP is turned to "1". When it is detected that the output of the flip-flop F2 is logic "1", the control part CC is brought into the position for special printing mode. In this position, the logic signal on the signal line l2 is turned to "0" which state is maintained for a certain term to reset the flip-flops F1, F2, stage counter 7C and speed control part (reate control) SC. Further, the signal l2 clears print figure registers PC1, PC2, first and second TP separation circuits TB1 and TB2 and five-bit shift register 5SR through a gate AR. Thereafter, the logic state of signal l4 is turned to "1" to open a gate AC through which the output of a coincidence circuit CO passes and then it is detected by signal l5. The output of the coincidence circuit contains information of whether or not the content of the print figure counter PC1 is coincident with the content of print figure storage register PR. When the contents are not coincident with each other, the control part CC turns the signal lF to "1" and lB to "0". Thereby the coil C is driven by a driver MD so as to move the carriage CA in forward direction for printing (see FIG. 3B). For example, when the content of the print figure counter PC1 is 0 and the content of the print figure register is n, the coincidence circuit CC generates a non-coincidence signal. The control part CC detects the non-coincidence signal and drives the carriage CA to execute printing in the above manner.

With the forward movement of the carriage CA, the screen plate SB formed as an integral part of the carriage is also moved passing through the space between photo diode LB and photo transistor PB. A certain time after, the screen plate leaves the area between the photo diode and the photo transistor. At the time, the photo transistor receives the light from the photo diode and, therefore, the photo transistor PB is turned to ON from OFF ("1"→"0"). The ON state of the photo transistor PB renders the signal lBC "0" which is applied to the gate AT through an inverter ITR.

On the other hand, the photo diode LE and the photo transistor PT on the carriage CA constitute a slit detector which moves along the slit plate OS with the forward movement of the carriage CA. The slit detector detects the slits SS in the slit plate OS one by one and generates a slit detection signal, that is, preliminary timing pulse FT which is applied to an amplifier AP1. The amplifier AP1 amplifies the preliminary timing pulse FT. The amplified timing pulse TP is applied to the gate AT, rate controller SC and TP clock pulse generator CTP through signal line lTP. As previously mentioned, the gate AT is receiving signals lF and lBC at its other input terminal. So long as the content of the print figure counter PC1 and the content of the print figure register PR are not coincident each other, the signal lF is applied as logic "1". The signal lBC becomes "1" at the time point at which the screen plate SB leaves the area between the photo diode LB and the photo transistor PB. Therefore, at this time point, the gate AT is opened and remains open thereafter. Through the gate AT the timing pulse TP is transmitted to the first TP separation circuit TB1 and the five-bit shift register 5SR.

Figure 3C:
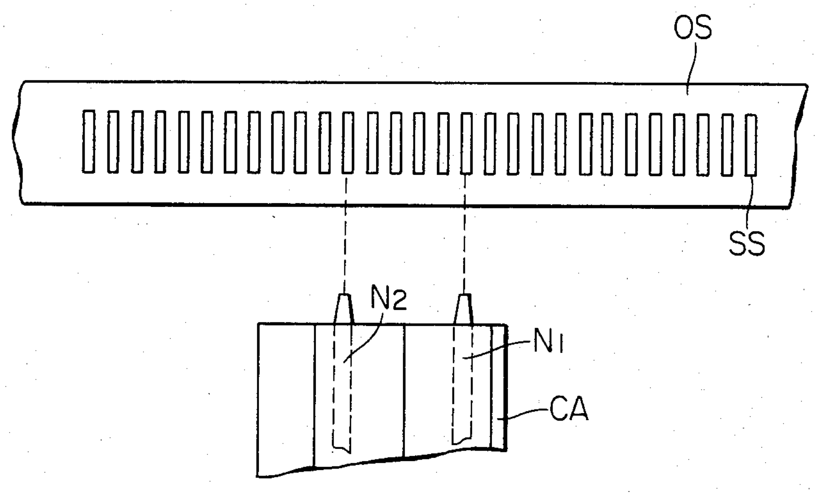
FIG. 3C is a schematic view showing the positional relation between the first and second recording heads N1 and N2.

The TP clock pulse generator CTP generates a pulse signal in response to the rise-up and fall-down of the pulse signal input to it. The pulse signal from the pulse generator CTP is applied to the shift register 5SR. From the register 5SR the pulse signal is put out with a delay of five timing pulse. This delayed output signal is used to control the driving of the second recording head N2. As shown in FIG. 3C, the recording head N2 is spaced from the recording head N1 by a distance of five slits. This spacing is required for capping and recovery of the nozzle. Because of this spacing, the print timing of the head N2 has to be shifted five slits, that is, five pulses relative to the head N1.

Figures 5, 5B:
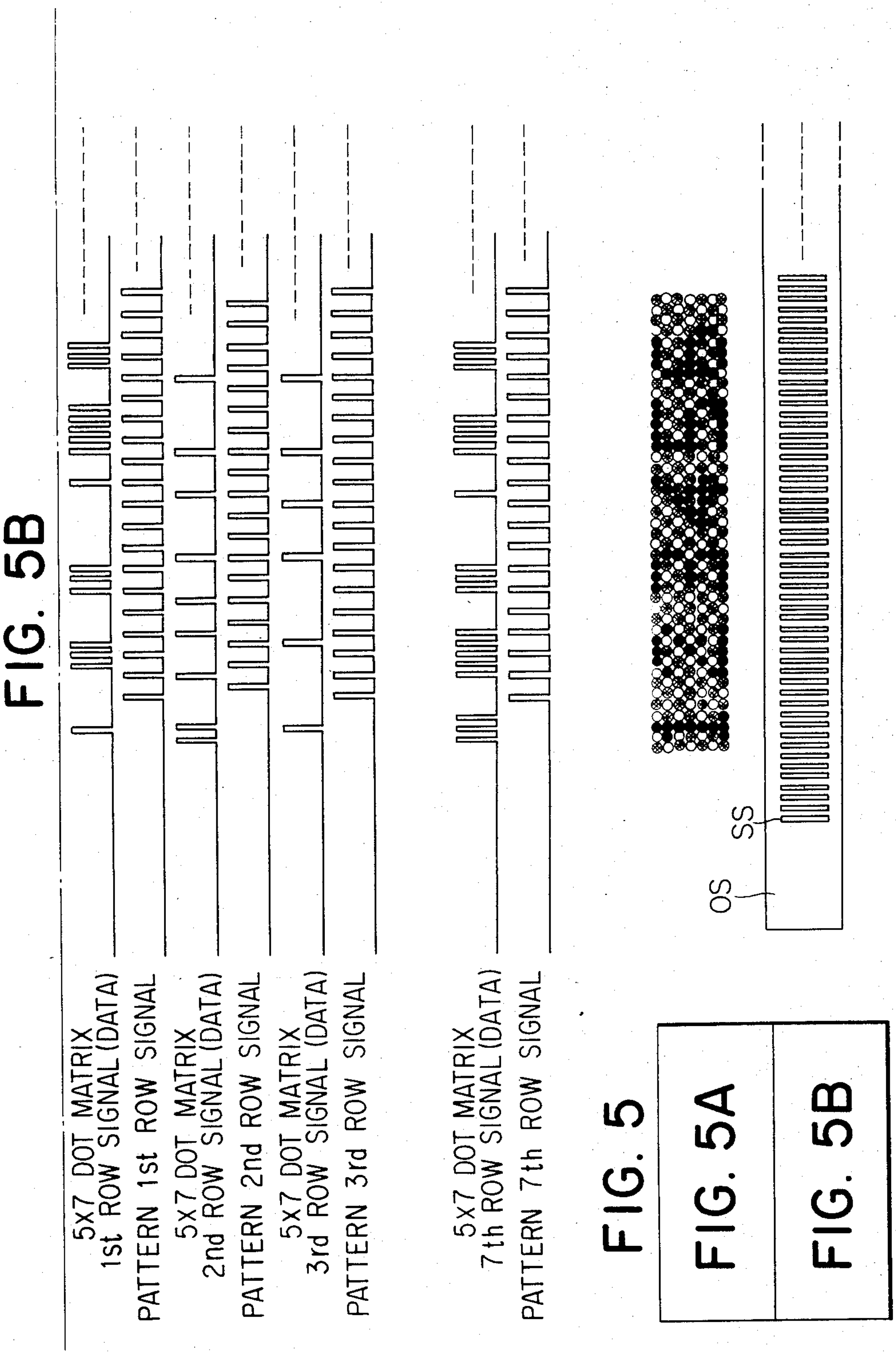
FIGS. 5, 5A and 5B is a timing chart of the operation thereof.
Figure 5A:
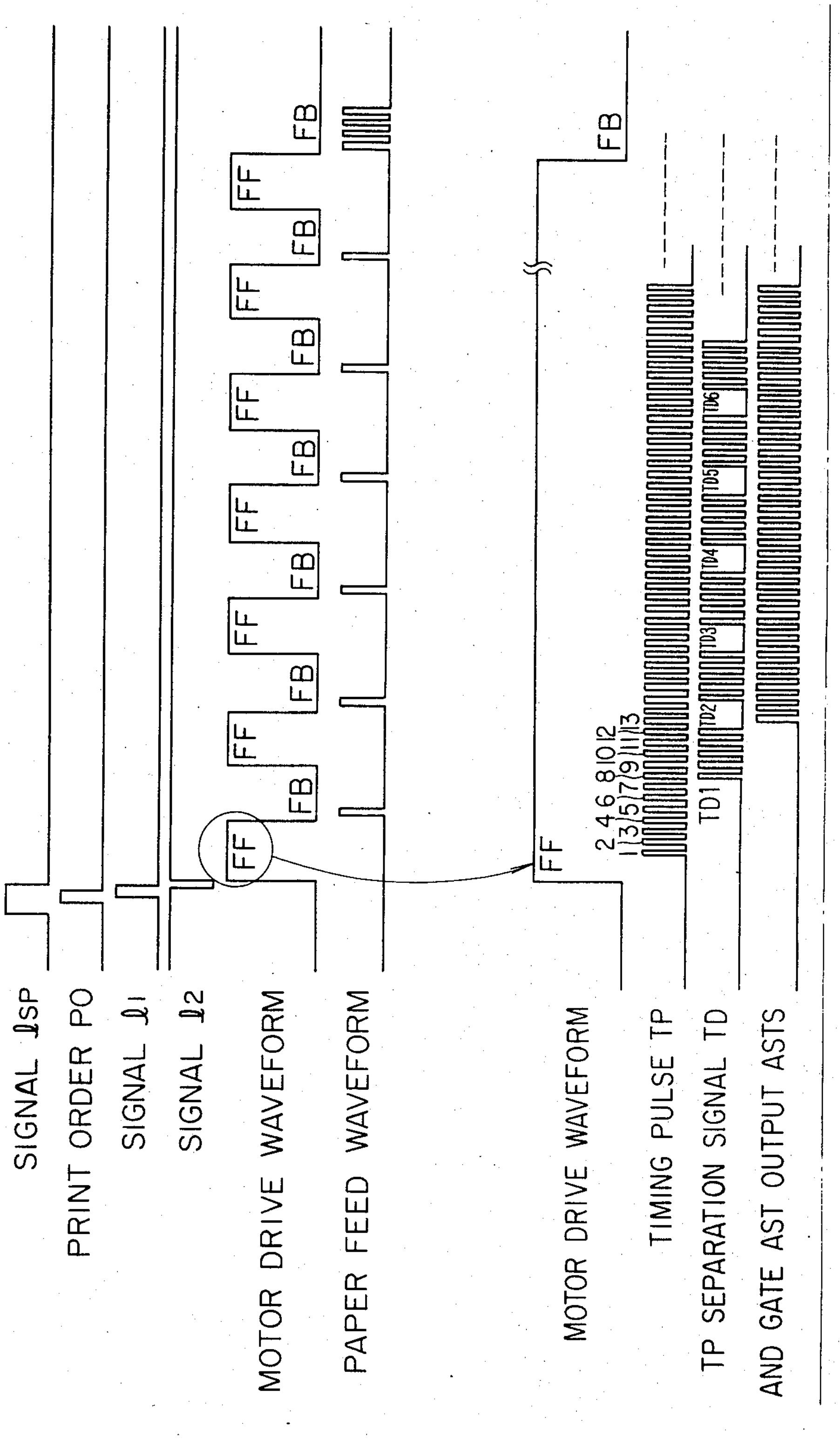

The pulse signal TP applied to the first TP separation circuit TB1 is separated into five pulse signals TD1–TDn necessary for printing one figure as shown in FIG. 5. The TP separation signal TD constituted of these pulses TD1–TDn is introduced into a parallel-serial converter PSC1 and a strobe signal generator SCR1. On the other hand, the above-mentioned delayed output pulse signal TP from the five-bit shift register 5SR is introduced into the second TP separation circuit TB2 and AND gate AST. The second TP separation circuit TB2 turns the logic of signal l13 to "1" when it detects the print start, that is, the coming of pulse signal TP. The signal l13 of logic "1" is applied to one input terminal of the AND gate AST to open the gate. Then, a pulse signal ASTS as shown in FIG. 5 is issued from the output terminal of the gate and is applied to a parallel-serial converter PSC2 and a strobe signal generator SCR2.

The number of print figures in one line is previously registered in the print figure resister PR. The figure of printed character is counted by the print figure counter PC1. A decoder DC1 receives the output from the register and selects the content of a print character memory CM. According to the selected content and under the output control by a stage counter 7C, a character generator CG1 (5×7 dot matrix) generates a five-bit print data signal which is then applied to the parallel-serial converter PSC1. As previously described, the parallel-serial converter PSC1 receives also TP separation signal TD from TP separation circuit TB1. When the signal TD is applied to the converter PSC1, it applies the print data signal to a gate SD1 one dot per pulse of TP separation signal. Since the gate SD1 has already been opened by the strobe signal issued from the strobe signal generator SCR1 in response to five-pulse TP separation signal TD, the print data signal can be introduced into a pulse width setting circuit DS1 through the gate SD1. In response to the print data signal, the pulse width setting circuit DS1 drives the driver PD1 to operate the piezo-electric element PZ1. Thus, an ink droplet is jetted from the nozzle N1 at every signal output from the parallel-serial converter PSC1. In this manner, printing of lateral five dots in one figure is attained in accordance with five-pulse TP separation signal TD.

MM is a pattern memory in which pattern to be printed by the second recording head N2 are stored. The content of the pattern memory MM to be printed out is selected by the decoder DC2 which receives the count output of the print figure counter PC2. According to the selected content and under the output control by the stage counter 7C, a second character generator CG2 (5×7 dot matrix) generates a seven-bit pattern signal which is then applied to the second parallel-serial converter PSC2. As previously mentioned, the parallel-serial converter PSC2 receives also the five-pulse shifted TP separation signal TD from the TP separation circuit TB2 through gate AST. When the shifted signal TD is applied to it, the parallel-serial converter PSC2 applies the pattern data signal to the gate SD2 one dot per pulse of the signal TD. Since the gate SD2 has already been opened by the strobe signal issued from the strobe signal generator SCR2 in response to the seven-pulse TP separation signal TD, the pattern data signal is introduced into a second pulse width setting circuit DS2 through the gate SD2. In response to the pattern data signal, the pulse width setting circuit drives the driver PD2 to operate the piezoelectric element PZ2. Thus, an ink droplet is jetted from the recording head N2 at every signal output from the parallel-serial converter PSC2. In this manner, printing of a seven-dot pattern is attained.

Figure 6A:
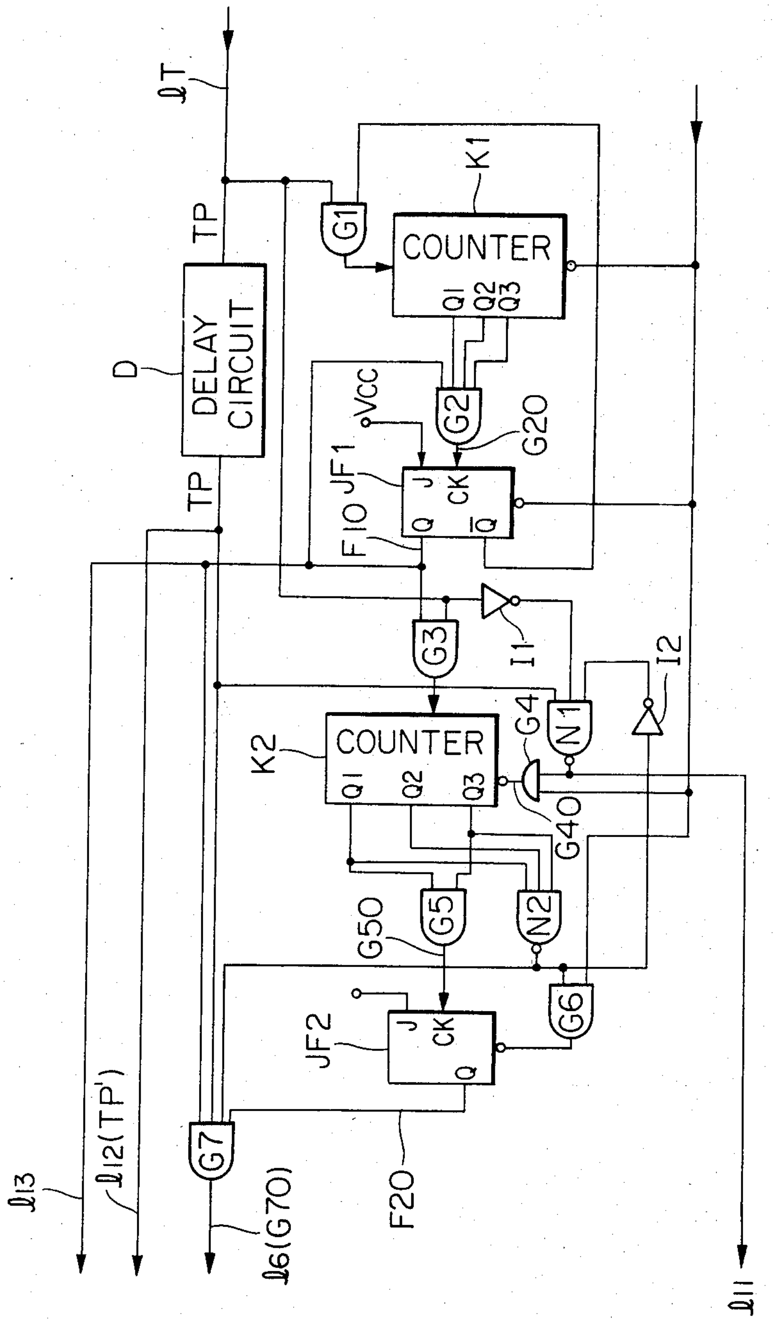
FIG. 6A is a block diagram showing an embodiment of TP separation circuit TB1 or TB2 shown in FIG. 4B.
Figure 6B:
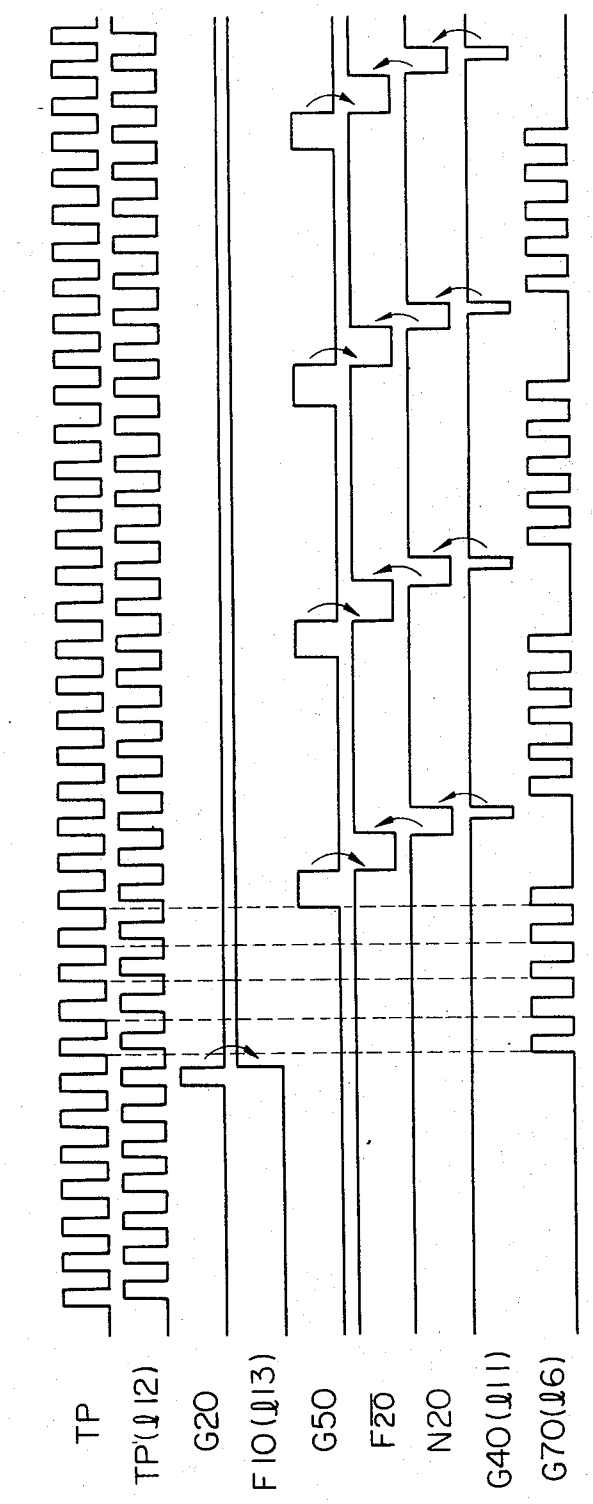
FIG. 6B a timing chart of the operation thereof.

The first and second TP separation circuits TB1 and TB2 may be formed, for example, as shown in FIG. 6A. This embodiment of TP separation circuit is composed of a delay circuit D, counters K1, K2, JK, flip-flops JF1, JF2, AND gates G1 to G7, NAND gates N'1, N'2 and inverters I1, I2 arranged as shown in FIG. 6A. The manner of operation thereof is seen from a timing chart shown in FIG. 6B.

With the ink jet printer shown in the above, one character is printed in a 5×7 dot matrix. The printing operation described above relates to character printing of five dots on the first one of seven stages in total and to pattern printing of seven dots on the same first stage in a 5×7 dot matrix for the first figure in a line. Upon the completion of character printing on the first stage of the first figure, the control part CC detects it by means of an output signal l11 from TP separation circuit TB1 and then generates an increment signal l7 to make the print figure counter PC1 advance one step of +1. Thereafter, in the same manner as described above, incidence or nonincidence between the contents of the print figure register PR and print figure counter PC1 is examined by the coincidence circuit CO. The output of the coincidence circuit is introduced into the control part CC through the gate AC being opened by signal l4. When the output signal of the coincidence circuit then introduced to the control part CC is of non-coincidence, the character data for the figure advanced +1 by the print figure counter PC1 is selected from the print character memory CM. The selected character data is printed out in the same manner as above in accordance with five-pulse signal TD2 coming from TP separation circuit TB1.

The printing of seven-dot first stage pattern is carried out by the second head N2 with a delay of five timing pulses relative to the printing by the first head N1. Therefore, at the time point of completion of printing of five dots of the first stage for the figure by the first head N1, the pattern printing by the second head N2 has not been completed yet. The completion of pattern printing of seven dots on the first stage for the figure is detected by the control part CC by means of an output signal l11' from TP separation circuit TB2. When the signal is detected, the control part CC generates an increment signal l7' to make the print figure counter PC2 advance one step of +1. In the manner as described above, the pattern data for the next figure indicated by the counter PC2 is selected from the pattern memory MM and printed out in accordance with seven-pulse signal coming from TP separation circuit TB2.

The above operation of step-up of the first and second print figure counters PC1, PC2, read-out of data from the memories CM, MM and input of the data to the first and second parallel-serial converters PSC1, PSC2 can be performed in a short operation time because the circuit operation clock is sufficiently faster than timing pulse TP. Therefore, the operation is completed sufficiently before the output of the next pulse groups from TP separation circuits TB1 and TB2.

In the manner described above, the first recording head N1 carries out selective dot character printing of the first stage of a line sequentially five dots per figure in accordance with the pulse groups of TD3, TD4, . . ., TDn sequentially applied from TP separation circuit TB1 while the second recording head N2 carries out the corresponding pattern printing seven dots per figure in accordance with the pulse groups sequentially applied from TP separation circuit TB2. In one line print, the content of print figure counter PC1 gets in coincidence with the content of print figure register PR at a time point. The control part CC detects it and generates an output signal l15 as logic "0" to close the gate SD1. Thereby the driver PD1 is deenergized and the driving of the head N1 is stopped. Subsequent to it, when the control part detects the completion of the pattern printing by the output of signal l11' from TP separation circuit TB2, the controller CC changes the logic of signal l14 to "0" to close the gate SD2. Thus, the driving of the second head N2 is stopped. After stopping the head, the control part CC generates signal l8 as logic "1" for a determined time long to drive the driver PFD for paper feed. At the same time, it clears up the print figure counters PC1, PC2, TP separation circuits TB1, TB2 and five-bit shift register 5SR. Also it makes the stage counter 7C take an increment +1. The output of the stage counter 7C is being applied to AND gate AL whose output signal l12 becomes "1" when the number of print stages reaches 7. Now, the stage number is not 7 yet, which is detected by the control part CC from the state of the output signal l12 of the gate AL.

Also, to move the carriage CA backward (see FIG. 3B), the control part CC turns the signal lF to "0" and lB to "1". Now, the carriage CA is moved toward the home position at a controlled speed. With the backward movement of the carriage CA, the screen plate SB is also moved toward the home position and again enters the area between photo diode LB and photo transistor PB thereby shutting off the light toward PB from LB. At the time, the photo transistor PB is rendered OFF ("0"→"1"). The output signal lTR of the photo transistor PB is being applied to the control part CC as signal lBC after amplified by the amplifier AP2. Therefore, from the inversion of the signal lBC, the control part can detect the arrival of carriage at the home position. When it is detected, the controller CC inverts the signal lB to "0" to stop the driving of the carriage CA in backward direction. Also, the control part inverts the signal l15 to "1" to open the gate SB1.

During the above operation for carriage return, the signal lF is "0" and therefore the gate AT remains closed. No timing pulse TP is introduced into TP separation circuits TB1 and TB2. Consequently, printing is not effected during the carriage return. However, paper feed is carried out simultaneously with the backward driving of the carriage CA.

After returning the carriage and feeding the paper, the control part CC executes the next stage printing because the control part CC, as noted above, has detected it from the stage of the signal l 12 that printing of the seventh stage of the 5×7 dot matrix has not been completed yet. The content of the stage counter 7C has changed from "0" to "1" by the above increment of +1. Therefore, the stage counter indicates the second stage at the character generators CG1 and CG2 this time. In the same manner as in printing of the above first stage of the dot matrix, the controller CC turns the signal lF to "1" and lB to "0" to bring the driver MD into operation and open one input of the gate AT.

The carriage is again driven to move forward. The screen plate SB on the carriage leaves the area between photo diode LB and photo transistor PB. The output signal lBC of the photo transistor PB after amplified by the amplifier AP2 changes from "1" to "0". The signal lBC is applied to the gate AT through inverter ITR to open the gate. During the forward movement of the carriage CA, the photo detector part LR, PT on the carriage produces timing pulses which are amplified by the amplifier AP1 and then appear on the signal line lTP as timing pulse TP. The timing pulse TP is applied to TP clock pulse generator CTP and also to TP separation circuit TB1 and five-bit shift register 5SR through the gate AT. At the TP separation circuit TB1, the applied timing pulse TP is separated into TP separation signals TD1–TDn each containing five pulses. Further, with a delay of five pulses, the timing pulse signal TP is applied to the parallel-serial converter PSC2 and the strobe signal generator SCR2 through the gate opened by the signal l13. The signal l13 continues to be "1" from the print start. Thereafter, in the same manner as described above, the contents of the character memory CM and the pattern memory MM corresponding to the first figure character and pattern are selected by the outputs of print figure counters PC1 and PC2 through decoders DC1 and DC2 respectively. And the stage counter 7C indicates the stage for which character data and pattern should be generated from the generators CG1 and CG2. Since the content of the stage counter 7C has been stepped up by +1 as previously mentioned, the print data generated from the character generators CG1 and CG2 this time are five-dot data and seven-dot pattern for the second stage of the 5×7 dot matrix. In accordance with the five-bit pulse TD signal from TP separation circuit TB1 and the timing pulse TP coming through the gate AST from the time point of print start (signal 13="1"), the print signal is put out bit by bit through the parallel-serial converters PSC1 and PSC2. Further, the outputs from the strobe signal generators SCR1 and SCR2 are applied to the pulse width setting circuits DS1 and DS2 through gates SD1 and SD2 respectively. Thus, drivers PD1 and PD2 are driven for a determined time width to put out the 5×7 dot matrix second stage character and pattern signals by which "data printing" and "pattern printing" of the second stage for the first figure are effected. This operation is repeated a number of times corresponding to the number of print figures for the second stage of the 5×7 dot matrix.

When the control part CC detects the completion of character printing for the second stage by the output from the coincidence circuit CO in the manner described above, the "data printing" is stopped by keeping the signal l15 at "0" until the "pattern printing" is completed. After detecting the completion of the pattern printing for the second stage by means of signal b11′, paper feed is carried out by signal l8. Also, the print figure counters PC1, PC2, TP separation circuits TB1, TB2 and five bit shift register 5SR are cleared up. The content of the stage counter 7C is stepped up +1. At the time, the control part CC detects also the output signal l12 of the gate AL being not "1", which informs that the 7th printing of the 5×7 dot matrix has not been completed yet. Therefore, the controller CC inverts the signal lF to "0" and lB to "1" to drive the carriage CA backward. Thus, the carriage CA is moved back toward the home position again under the control of running speed. With the backward movement of the carriage, the screen plate SB on the carriage again enters the area between photo diode LB and photo transistor PB thereby shutting off the light toward the latter from the former. At that time, the state of photo transistor's output signal lBC changes from "0" to "1" from which the control part CC detects the arrival of carriage CA at the home position. The control part CC turns the signal lB to "0" to stop the driving of the carriage CA in the backward direction. At the same time, it turns the signal l15 to "1" to open the gate SD1. Thereafter, the printing of the next stage the stage number of which is indicated by the stage counter 7C stepwise counting up by +1, is executed in the same manner as above.

In the manner described above, the following third stage, fourth stage, fifth stage, sixth stage and seventh stage printings are carried out sequentially. After completing the seventh stage printing of the 5×7 dot matrix, the control part CC carries out paper feed in an amount of one dot line. Also, similarly to the above, the control part CC clears up the print figure counters PC1, PC2, TP separation circuits TB1, TB2 and five-bit shift register 5SR. The content of the stage counter 7C is further counted up by +1. At the time, the output signal l12 from the gate AL becomes "1" which gives the controller CC the information that printing of the seventh stage of the 5×7 dot matrix has now been completed. After detecting it, the controller CC changes the signal lF to "0" and lB to "1" to return the carriage CA back to the home position. When the arrival of the carriage at the home position is detected from the change of the amplified (by amplifier AP2) output of the photo transistor PB from "0" to "1", the controller CC stops the backward driving of the carriage CA. Subsequent to it, the controller turns the signal l15 to "1" and signal l14 to "0" to close the gate SD2 which is an output gate for pattern printing. In a manner similar to the above, during the carriage return to the home position, the driver FD is operated by signal lB so as to carry out paper feed three times. In this manner, printing of one line is completed.

The operation described above is the printing operation in the special printing mode where a pattern is printed together with data on the same print line using two recording heads N1 and N2. As previously mentioned, the special printing mode can be set by the input of any one of the special keys.

In the ordinary printing mode, the control part CC is again prepared for printing by the input of print order signal PO. In this position, the control part CC discriminates the state of the set output signal lSP of flip-flop F2 to know that the printing mode is the ordinary mode. After discriminating the ordinary mode, the controller CC turns the signal l14 to "0" to close the gate SD2. Thereby, pattern printing in the second ink color by the second head N2 is inhibited this time. Only data printing is effected using only the first ink jet nozzle N1 in the first ink color.

Figure 7:
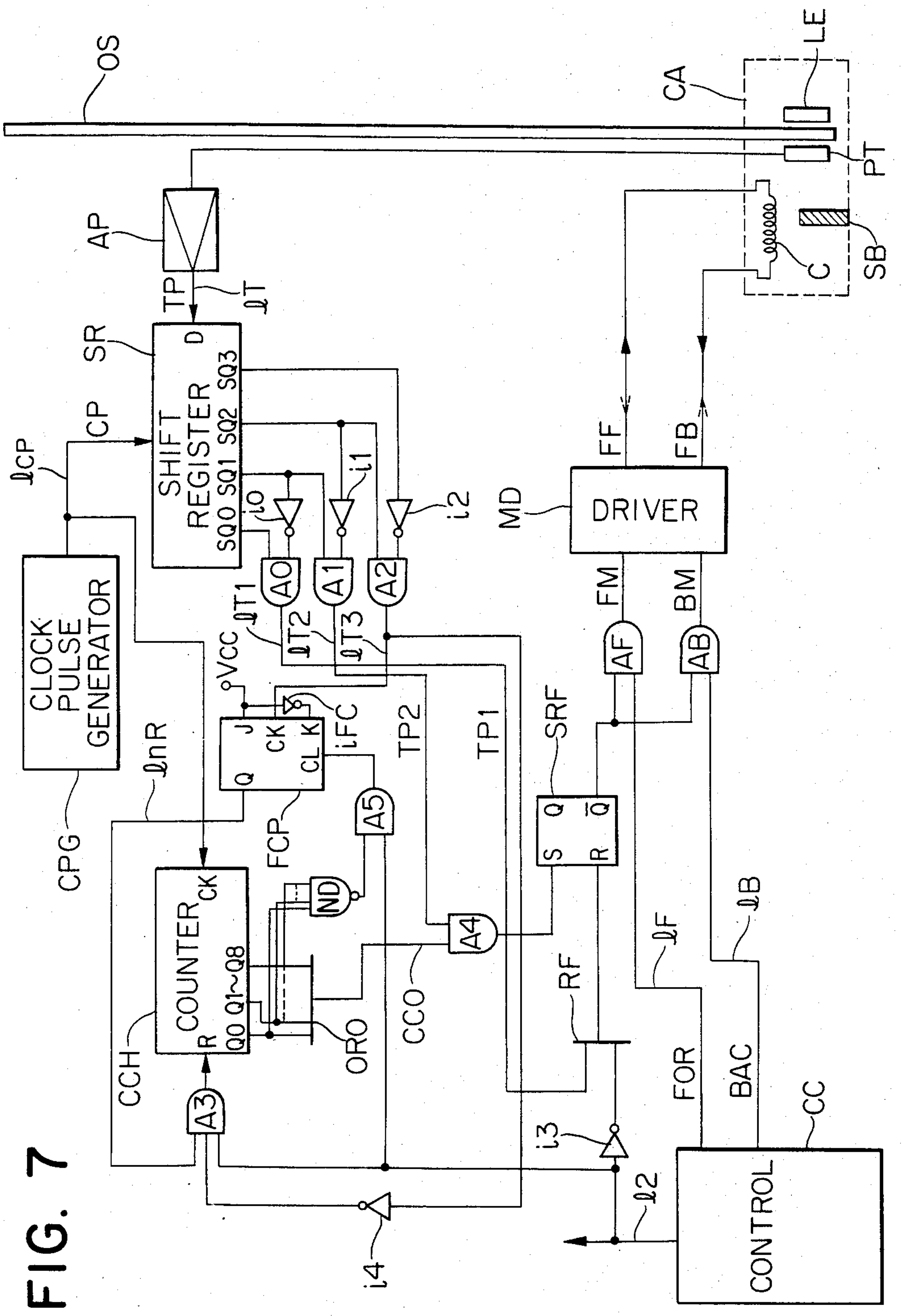
FIG. 7 is a block diagram showing an embodiment of the speed control part SC shown in FIG. 4B.
Figure 8:
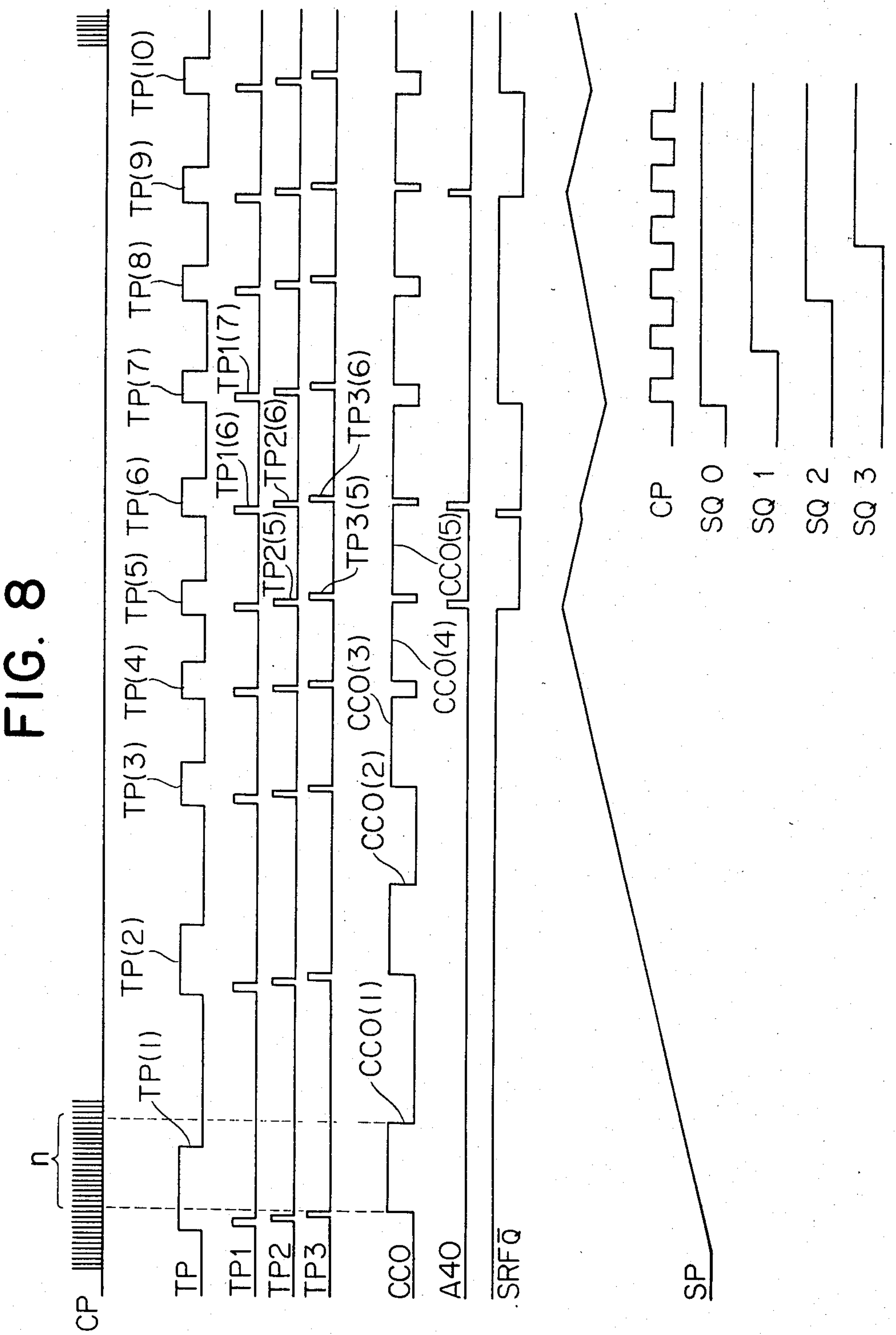
FIG. 8 is a timing chart of the operation thereof.

The manner of operation of the rate control part SC for controlling the running speed of the carriage CA will be described hereinafter with reference to FIGS. 7 and 8 in which FIG. 7 shows a concrete arrangement of the rate control part SC and FIG. 8 is a timing chart showing the operation thereof.

Referring first to FIG. 7 the carriage CA, as described above, has a photo diode LE and a photo transistor PT mounted thereon. With the movement of the carriage CA, the photo diode LE and the photo transistor PT also move along the slit plate OS to optically detect the slits in the slit plate OS. Thereby the timing pulse TP is generated. As previously mentioned, the timing pulse TP is taken up through an amplifier AP1. SR is a four-bit shift register having four outputs SQ0, SQ1, SQ2 and SQ3. CPG is a clock pulse generator. In response to the coming of timing pulse TP1 and at every clock CP generated from the generator CPG the four outputs of the shift register SR are sequentially set. The signal of SQ1 is inverted by an inverter i0 and then applied to AND gate A0. Applied to another input of the gate A0 is the signal SQ0. The logical product of the inverted signal of SQ1 and the signal of SQ0, namely an output signal TP1, is issued from the gate A0. The output signal TP1 is introduced into a signal line lT1. Similarly, the signal of SQ2 is inverted by inverter i1 and then applied to one input of AND gate A1 to the second input of which the signal of SQ1 is applied. From the AND gate A1 there is obtained the logical product of the inverted signal of SQ2 and the signal of SQ1, namely, an output signal TP2 which is applied into signal line lT2. The signal of SQ3 is inverted by inverter i2 and then applied to one input of AND gate A2 to the second input of which is applied the signal of SQ2 to make a logical product of the two input signals. The output signal TP3 from the gate A2 is introduced into signal line lT3.

Signals TP1, TP2 and TP3 appearing on the signal lines lT1, lT2 and lT3 are shown in FIG. 8.

The output signal TP1 resets a flip-flop SRF through OR gate RF. The output signal TP2 is applied to AND gate A4 to open the gate for the signal time of TP2. The output signal TP3 sets a flip-flop FCP and also is applied to AND gate A3 to reset it through an inverter only when the signal TP3 is "1". When the output signal is "0", the inverted output "1" cancels the resetting of the gate to allow the clock CP to enter a counter CCH from the signal line lCP.

When the signal l2 is "0" for a term at the print start, the counter CCH is reset by the output from the gate A3. The flip-flop FCP is reset by the output from AND gate A5. The flip-flop FCP also applies a signal nR to the gate A3 as "0" to keep the counter CCH in the reset position. When the flip-flop FCP is set by the change of signal TP3 from "1" to "0", the signal nR is turned to "0". After that, when the timing pulse TP becomes "0", the resetting of the counter CCH is cancelled. From this time point of reset cancel, the counter CCH starts counting. Upon the completion of counting, all of the counter's outputs Q0 to Q8 become "1" and therefore the output of NAND gate ND becomes "0" by which the flip-flop FCP and also the counter CCH are reset.

Also, the flip-flop SRF is reset by the signal 2 applied to it through inverter i3 and OR gate RF because each one input of AND gates AF and AB is in the operating state of "1".

The manner of operation of the above speed controller is as follows:

Referring to FIG. 8, pulse signals TP1, TP2, TP3 are generated from gates A0, A1, A2 by the generation of pulse TP(1) of the input signal TP. The flip-flop FCP is set by the pulse signal TP3 and clock CP is applied to the counter CCH. The counter starts counting the clock and continues counting up to a preset number of counts while generating count outputs from Q0, Q1 . . . Qn sequentially. During the time up to n counts, the output signal CCO of OR gate ORO is "1" which is applied to one input terminal of AND gate A4 to the other input terminal of which is applied signal TP2 from the signal line lT2. As previously described, the pulse signal TP is generated with the movement of the carriage CA. The timing and time width of the pulse signal TP have a direct relation with the running speed of the carriage. Therefore, when the carriage speed is not sufficiently high, there is obtained such an input timing pulse as TP(1) in FIG. 8. In this state of input timing pulse, the pulse signal TP2 which is generated from the gate A1 with the generation of the pulse TP, cannot be generated before the end of counting by the counter CCH. Therefore, the gate A4 remains closed and the flip-flop SRF which has been reset by the previously generated pulse signal TP1 through OR gate RF remains in the reset state. This state has no effect on AND gates AF and AB. Consequently, the carriage CA having an integral motor coil C continues to be driven.

Like the case of pulse TP(1), even in the cases of pulse TP(2), (3) and (4), no logical product of counter output CCO and signal TP2 can be produced by AND gate A4, and therefore, there is no change in driving of the motor coil C. However, since the driving continues, the running speed of the carriage CA increases gradually with time and the pulse interval of the timing pulses becomes narrower accordingly. Finally, at the output of pulse TP(5), the gate A4 receives the counter output signal (4) and the pulse TP2(5) of the signal TP2 at the same time. So, the output signal A40 of the AND gate A4 becomes "1". Thereby the flip-flop SRF is set.

When the flip-flop SRF is set, its output $\overline{Q}$ changes from "1" to "0" and AND gates AF and AB are closed. Signals FM and FB are turned to "0" which renders the driver MD inoperative to stop the driving of the coil C. Even after the driving of coil C is stopped, the carriage CA continues running owing to inertia. But, its speed is slowed down by friction.

Then, the counter CCH is reset by the signal TP3(5) which is the pulse $\overline{\text{TP3(5)}}$ of the signal TP3 inverted through an inverter. By the fall-down of the pulse TP3(5), the flip-flop FCP is set. Therefore, the counter CCH starts counting again. Pulse TP1(6) generated by pulse TP(6) of the next signal TP resets the flip-flop SRF through gate RF and the output $\overline{Q}$ of the flip-flop is turned to "1" to open the gates AF and AB whereby the coil C is driven again.

During the time of from pulse TP2(5) of signal TP2 to pulse TP1(6) of signal TP1, the driving of the coil C is stopped and the carriage speed is slowed down. However, at the time point of generation of pulse TP(6), the running speed of the carriage is still high. Therefore, like the case of timing pulse TP(5), the pulse TP2(6) and the output signal CCO(5) from the counter CCH are applied to the gate A4 at the same time, which produces an output of AND by which the flip-flop SRF is set again. The gates AF and AB are closed to stop the driving of the coil C. The driving of the coil continues to stop until the next pulse TP(7) is generated and the pulse TP1(7) is produced out by it. At the time, like the above, the counter CCH is reset by the inverted output $\overline{\text{TP3(6)}}$. Also, the flip-flop FCP is set by the fall-down of the pulse TP3(6). Therefore, the counter CCH starts counting again.

Similarly to the above, pulse TP1(7) of the signal TP1 produced by the next timing pulse TP(7) resets the flip-flop SRF through gate RF to open the gates AF and AB and to drive the coil C again.

The above operation is repeated for the following pulses. The coil is driven by the logical product of signal TP2 and counter output CCO. At pulses TP(7) and TP(8), the driving of the coil C is not stopped. At pulse TP(9) the driving of the coil is stopped as at the pulses TP(5) and TP(6). In this manner, the running speed of the carriage CA is controlled in both of the forward and backward directions based on the n clock pulses CP counted by the counter CCH.

As will be understood from the foregoing, the present invention contributes to improvement in working efficiency of the operator. With the apparatus according to the invention, the operator can select the special printing mode at will. In the special printing mode, data are printed with a background pattern printed in different color from the color in which the data are printed. The data printed in the special printing mode are clearly distinguishable from those printed in the ordinary printing mode. Therefore, it is possible to print data in the special printing mode which the operator especially wishes to know, for example, data of arithmetic operation result, while printing other data in the printing mode. When data are printed in this manner, the operator can find the desired data such as an arithmetic operation result at a glance from among many printed data. This will greatly improve the efficiency of work.

While we have not particularly shown and described any preferred example of the pattern to be printed in the special printing mode, such patterns are suitable for the purpose of the invention which make the printed data easy to read and also easily distinguishable from other data printed in ordinary printing mode.

Obviously many modifications and variations of the present invention are possible in the light of the above teachings. For example, as special printing mode instruction means there may be used other types of special key TKEY than [#] and [T] particularly shown in the above embodiment.

What we claim is:

1. An ink jet printer comprising:

a first ink jet nozzle for jetting ink of a first color;

a second ink jet nozzle for jetting ink in a second color different from said first color, first memory means associated with said first ink jet nozzle for storing information to be printed by said first ink jet nozzle, second memory means associated with said second ink jet nozzle for storing information to be printed by said second ink jet nozzle, and control means for selectively providing to said second ink jet nozzle and said first ink jet nozzle information stored in said respective memory means for printing a background pattern with one said ink jet nozzle and characters that appear to be superimposed on the background pattern with the other said ink jet nozzle.

2. An ink jet printer according to claim 1, wherein said background pattern includes a zig-zag pattern.

3. An ink jet printer according to claim 2, wherein said first memory means stores character information and said memory means stores background pattern information.

4. An ink jet printer according to claim 1, further comprising selecting means for selecting one of a first operating mode for printing characters without the background pattern and a second operating mode for printing characters and a background pattern wherein said selecting means provides said operating modes by causing said control means to provide from said memory means only character information and character information with the background information depending on the selecting operating mode.

5. An ink jet printer comprising:

a first ink jet nozzle for jetting ink of a first color;

a second ink jet nozzle for jetting ink of a second color;

first memory means associated with said first ink jet nozzle for storing information to be printed by said first ink jet nozzle;

second memory means associated with said second ink jet nozzle for storing information to be printed by said second ink jet nozzle according to contents stored therein; and generating means for generating a dot pattern with said ink jet nozzles by selectively providing to said second ink jet nozzle and said first ink jet nozzle information stored in said respective memory means for printing a background pattern with one said ink jet nozzle and characters with the other said ink jet nozzle, wherein said characters have a greater dot density than said background pattern.

6. An ink jet printer according to claim 5, wherein said background pattern includes a zig-zag pattern.

7. An ink jet printer according to claim 5, wherein said generating means comprises two separate units provided for said respective first and second memory means, each said unit converting code data supplied from the associated memory means into a dot pattern and applying successive dot patterns to the associated ink jet nozzle.

8. An ink jet printer according to claim 7, wherein said first memory means stores character information and said second memory means stores background pattern information.

9. Electronic apparatus provided with a printer, said apparatus comprising:

a first ink jet nozzle for jetting ink in a first color, a second ink jet nozzle for jetting ink in a second color different from said first color, a first memory for transmitting character data to said first ink jet nozzle, a second memory for transmitting to said second ink jet nozzle data which form a background pattern for said character data, selection means for selecting the use of said second ink jet nozzle and memory together with said first ink jet nozzle and memory, and a carriage having said first and second ink jet nozzles mounted therein, and means for moving said carriage to cause said first and second nozzles to scan a recording medium, wherein when said second ink jet nozzle and memory are selected by said selection means, said first and second memories operate in correspondence with movement of said carriage and said first and second ink jet nozzles are sequentially operated to form characters with a background pattern.

10. Electronic apparatus as set forth in claim 9, wherein said background pattern includes a zig-zag pattern.

11. Electronic apparatus as set forth in claim 9, wherein said carriage is driven by a linear motor.

* * * * *